May 10, 1955

F. F. HANSEN 2,707,924

SHEETED DOUGH TURNER

Filed Aug. 27, 1954

INVENTOR.
FRANCIS F. HANSEN.
BY
Christy, Parmelee & Strickland
ATTORNEYS.

2,707,924

SHEETED DOUGH TURNER

Francis Frederick Hansen, Pittsburgh, Pa.

Application August 27, 1954, Serial No. 452,534

5 Claims. (Cl. 107—12)

This invention is for an improvement in bakery machinery and is for a mechanism for turning dough after it has been sheeted and preparatory to curling it into a loaf. The present invention is for an improvement in dough turning apparatus disclosed in my copending application Serial No. 263,572, filed December 27, 1951.

In my application aforesaid the sheeted dough drops from the sheeting rolls onto a composite conveyor having parallel fast and slow belts, and the faster motion imparted to that portion of the dough sheet which rests on the faster belt creates a turning movement designed to rotate the dough 90° from its original position on the belt. This is desirable so that the dough structure which is elongated in passing through the sheeting rolls may be subsequently curled into a loaf with the lines of elongation most favorably disposed in the loaf to avoid any spiral appearance in the texture of the finished bread.

While satisfactory for many sizes of loaves and under favorable conditions, the arrangement disclosed in my copending application is not always satisfactory, especially with some doughs and on larger sheets. This is due in part to the fact that when the dough falls onto the parallel belts moving at different speeds, the action does not result in a true pivoting movement of the dough mass which would occur if the dough were a rigid body, but results instead in a buckling or warping of the dough sheet in the region where there is a conflict of forces between the faster and slower moving components of the dough sheet.

The present invention is designed to correct this difficulty by interposing an apron down which the dough must slide after it leaves the sheeting rolls and before it come to position on the belts, this apron having a discharge end designed to retard the complete sliding of the dough onto the slower moving belt until that part which is to engage the faster moving belt has been completely deposited on that belt, whereby the turning movement will be well advanced while a portion of the dough is still on the apron.

The object of my invention therefore is to provide in an apparatus for turning sheeted dough utilizing parallel conveyor belts moving at different speeds, means for improving the turning operation.

A further object of my invention is to provide in such a dough turning apparatus, an apron between the sheeting rolls and the belt conveyor which will cause the turning movement to begin before the dough has been completely loaded onto the conveyor.

My invention may be more fully understood by reference to the accompanying drawings, in which.

Figure 2:
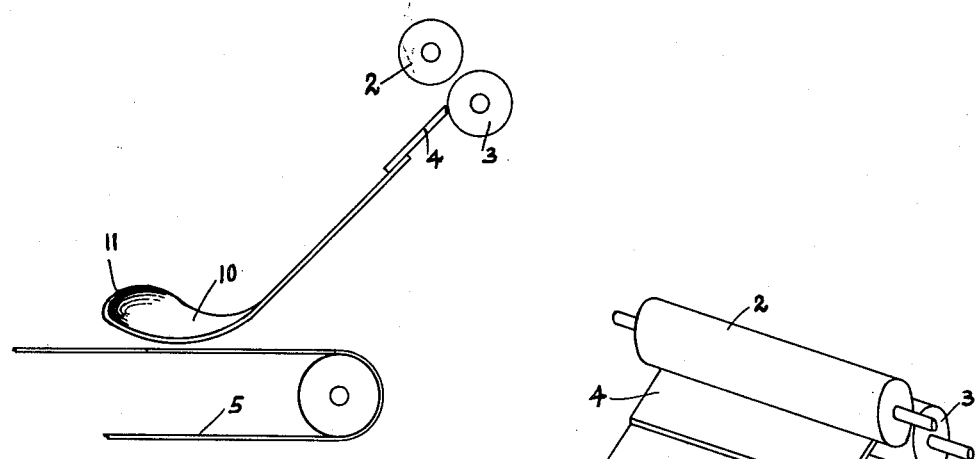
Fig. 2 is a more or less schematic side elevation of the apparatus shown in Fig. 1.
Figure 1:
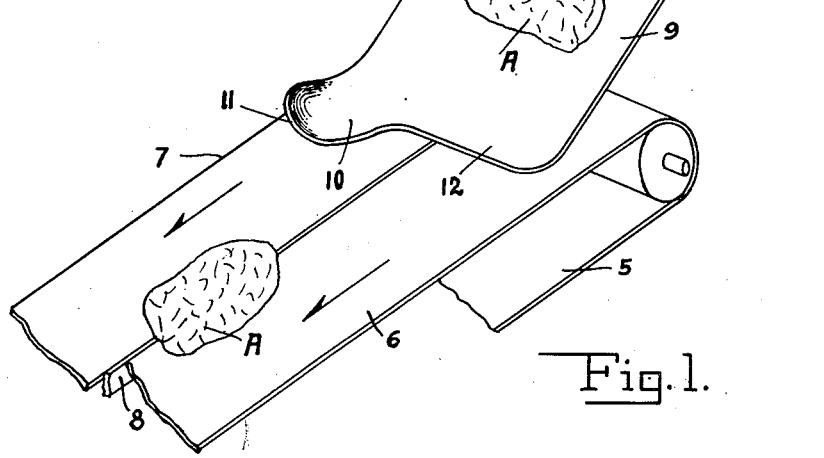
Fig. 1 is a perspective view of an apparatus constructed in accordance with my invention.
Figure 3:
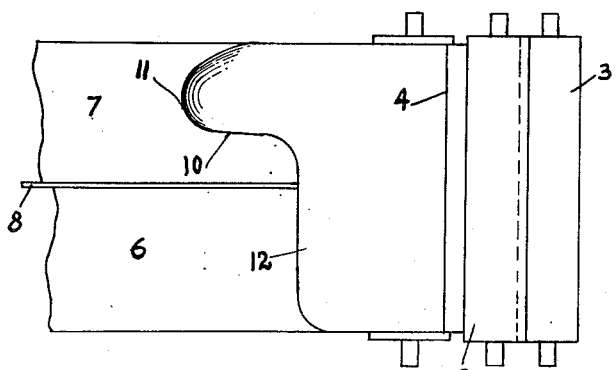
Fig. 3 is a plan view, also schematic, of the apparatus shown in Fig. 2.

Referring to the drawings in more detail, there is shown a pair of sheeting rolls 2 and 3 between which a piece of dough, which has previously been weighed and removed from the original dough mass is passed, these rolls being power driven as is well understood in the art. They squeeze the dough into a flattened ovular shaped piece or sheet which moves out of the rolls over a stripper 4. The dough, in being thus rulled, has its gluten cells or fiber elongated in one direction.

Beneath the sheeting rolls there is a conveyor unit 5 comprised of two parallel canvas or like belts 6 and 7 which are separately driven, the driving mechanism not being shown at relatively different speeds, 6 being the faster, and 7 the slower. Separate drive motors may be used so as to regulate the differential speed between them. Preferably there is a narrow fixed parting strip 8 between the two belts.

According to the present invention an inclined apron 9 is secured at its upper end to the stripper. It has a relatively steep inclination, about 45° or more, so that the dough slides readily down it. The lower end of the incline is about an inch or so above the conveyor. That portion of the apron that is over the faster belt and the part over the inner edge of the slower belt terminates at the bottom of the incline. However, over about half the outer width of the slower belt the apron has an extension that overhangs the belt. This extension, designated 10, has a slight upward curve in a fore-and-aft direction so that the extreme tip 11 is higher than the main lower edge 12 of the apron. In other words, its top surface is slightly concaved in the direction of the length of the conveyor. Besides being concaved, the projection has a slight tilt from the outer edge toward the center.

Flour is supplied to the apron, and the dough, upon emerging from the sheeting rolls, slides down the apron, gaining considerable forward velocity. The dough sheet, marked A, starts to leave the apron with this forward velocity and falls upon the faster moving belt, sagging down, however, so that some of it soon contacts the slower moving belt, but the extreme end of the sheet of dough on the side which moves onto the extension 10 has its forward velocity checked, so that a pivoting action of the dough takes place until the entire mass is eventually pulled clear of the apron, at which point the turning of the sheet will have progressed substantially. The remainder of the turning will then continue as the dough is carried along with no buckling or warping. As is usual in bakery practice, the belts will be flour-coated so that the dough will not stick to them and the balance of the turning can occur readily.

The operations following the turning, like the operations before sheeting, are well known in the art; are more fully described in my copending application, and are not here required to be shown.

It will be apparent that while the exact form of apron here shown is quite effective, various changes and modifications may be made therein within the contemplation of my invention.

I claim:

1. In a bread making apparatus comprising a pair of sheeting rolls and a conveyor, the conveyor having two relatively movable elements designed to operate at different speeds, said conveyor being movable in a direction at right angles to the axes of the sheeting rolls, the herein described invention comprising an inclined apron positioned between the two rolls and the conveyor for receiving the sheeted dough from the rolls and delivering it by gravity to the conveyor, the apron having a lip at its lower end of a width substantially equal to the width of the conveyor and having an extension that projects beyond the lip over one only of said relatively movable conveyor elements.

2. Sheeted dough turning apparatus comprising a conveyor having parallel slow and fast belts positioned side by side with the top surfaces thereof being in the same plane, an inclined apron above the conveyor positioned to receive pieces of sheeted dough and discharge them with a forward velocity onto the top surface of the conveyor belts, and means on the apron for checking the forward velocity of the pieces of dough over the outer side portion only of the slower of the two belts.

3. Sheeted dough turning apparatus comprising a conveyor having parallel slow and fast belts positioned side by side with the top surfaces thereof being in the same plane, an inclined apron above the conveyor positioned to receive pieces of sheeted dough and discharge them with a forward velocity onto the top surface of the conveyor belts, said apron having an extension that projects along the conveyor over the outer side of the slower belt only for supporting a portion of the sheeted dough after most of it has been transferred from the apron to the conveyor.

4. Sheet dough turning apparatus as defined in claim 3 wherein the extension is concaved lengthwise of the conveyor and is sloped from the outer edge downwardly toward the longitudinal center of the conveyor.

5. Sheet dough turning apparatus as defined in claim 3 wherein the extension is more nearly parallel with the plane of the top surface of the conveyor than is the apron which is at a steep angle with respect thereto and wherein the transverse width of the extension is only about half the width of the slower belt.

References Cited in the file of this patent

UNITED STATES PATENTS

| 795,581 | Corby | July 25, 1905 |
| 1,192,156 | Bainbridge | July 25, 1916 |
| 1,616,101 | Ackley | Feb. 1, 1927 |
| 1,763,620 | Wolfarth et al. | June 10, 1930 |
| 2,450,033 | Cohen | Sept. 28, 1948 |
| 2,631,549 | Rhodes | Mar. 17, 1953 |